United States Patent [19]
Saito

[11] Patent Number: 5,216,586
[45] Date of Patent: Jun. 1, 1993

[54] POWER SUPPLY START-UP CIRCUIT

[75] Inventor: Seiichi Saito, Kanagawa, Japan

[73] Assignee: Mitsubishi Denki Kabushiki Kaisha, Japan

[21] Appl. No.: 831,865

[22] Filed: Feb. 5, 1992

[30] Foreign Application Priority Data

Feb. 7, 1991 [JP] Japan ................. 3-016527
Sep. 27, 1991 [JP] Japan ................. 3-249243

[51] Int. Cl.$^5$ .............................. H02M 7/517
[52] U.S. Cl. ......................... 363/49; 323/901; 363/65
[58] Field of Search ............... 323/901; 363/49, 65, 363/71

[56] References Cited

U.S. PATENT DOCUMENTS 4,405,975 9/1983 Overstreet et al. ............... 363/49
4,698,743 10/1987 Onodera et al. ................. 363/49
4,941,077 7/1990 Fabianowski et al. ............ 363/49

FOREIGN PATENT DOCUMENTS 2195626 2/1990 Japan .

Primary Examiner—Steven L. Stephan
Assistant Examiner—Jeffrey Sterrett
Attorney, Agent, or Firm—Wolf, Greenfield & Sacks

[57] ABSTRACT

A switch is connected in series with a capacitor inserted in parallel into a direct-current output portion, and the switch is controlled to turn OFF when an AC input source is not connected to a power unit and turn ON when a constant time period has elapsed after the connection to the AC input source. The capacitor is charged when the switch is in the OFF state but not charged in response to the connection to the input source.

18 Claims, 5 Drawing Sheets

POWER SUPPLY START-UP CIRCUIT

BACKGROUND OF THE INVENTION

1. Field of the Invention

The present invention relates generally to a power supply apparatus and a power connecting method, and more particularly to a power supply apparatus which, irrespective of a fault of a power source for a computer such as a fault-tolerant computer, continues to supply power to the computer and which is capable of exchanging the faulty power source as the hot line is kept to the energized state in terms of AC and DC.

2. Description of the Prior Art

FIG. 5 shows a circuit and arrangement of a basic portion of a conventional hot-line type power supply apparatus. In the illustration, numeral 1 represents a power unit making up the hot-line type power supply apparatus. In the internal circuit of the power unit 1, D1 to D4 respectively designate diodes, C1 and C2 respectively depict capacitors, L1 denotes an inductor, T1 indicates a pulse transformer, and TR1 is a switching transistor for converting into a pulse voltage a direct-current voltage developed across the capacitor C2. The diodes D2 and D3 make up a rectifier M, and the capacitor C1, the inductor L1 and others constitutes a smoothing circuit F.

Operation of the apparatus thus arranged will be described hereinbelow. In the power unit 1, an input rectified by a full-wave rectifier and ON-OFF controlled by the transistor TR1 is supplied to an input side of the transformer T1 to generate an output having a great amplitude, the output of the transformer T1 being rectified by the rectifier M and then smoothed by the smoothing circuit F so as to produce a direct current (DC) output whose voltage value is 5 [V], for example. In this case, an output line 30 for supplying the 5 [V] DC voltage is coupled in common to the output sides of the respective power units. Thus, even if one power unit malfunctions, the other power unit can compensate for this power unit trouble. Similarly, the input sides of the respective power units are coupled in common to an input line 31. Here, the diode D3 is a flywheel diode to obtain a rectified electric power. Although in FIG. 5 there are illustrated three power units, the 5 [V] DC output load can be covered by the total output capacity of two power units.

Now, assuming that one of the power units 1 malfunctions, difficulty is encountered to correctly generate the switching pulse at the secondary side 2 of the transformer T1 of the faulty power unit, whereby the voltage is lowered at the junction portion 3 between the inductor L1 and capacitor C1 making up the circuit F. Although the faulty power unit cannot output the 5 [V] DC because of the lowering of the voltage at the junction portion 3, the other two power units supply the 5 [V] DC therefor, thus allowing the continuous supply to the load.

On the other hand, the faulty power unit detects the lowering of the voltage at the junction portion 3 and gives information to the operator for exchange with a new one. The removal of the faulty power unit does not affect the 3 [V] output because current does not flow through an output terminal 4 line. Further, in inserting a new power unit in place of the faulty power unit, the voltage at the junction portion 3 is 0 [V] in the initial state and hence electric charge is not charged into the capacitor C1, while the reverse-current preventing diode D1 prevents the supply of current from the 5 [V] DC line to the capacitor C1 and hence the insertion of the new power unit does not affect the 5 [V] DC output. In response to the operation of this new power unit to restore the voltage at the junction portion 3, current directs through the diode D1 to the 5 [V] DC line.

In the conventional hot-line type power supply apparatus thus arranged, since the reverse-current preventing diode D1 is always connected in series to the output portion of the power supply, when the forward-direction voltage drop is taken to be $V_F$, the power loss is taken as P and the output current of the power unit is $I_F$, they take the following relation and there is a problem that the conversion efficiency of the power supply lowers and generates heat.

$$P = V_F \times I_F$$

For example, when $I_F = 100$ A and $V_F = 1$ V, the power loss P becomes 100 W, thus resulting in a great problem.

SUMMARY OF THE INVENTION

The present invention has been developed in order to eliminate the above-described problem, and it is an object of the present invention to provide a power supply apparatus and power connecting method which is capable of preventing the lowering of the power conversion efficiency and increase in heating.

A power supply apparatus according to this invention is arranged such that the reverse-current preventing serial diode which causes the power loss is removed from the output portion, a switch is provided to be in series to the capacitor disposed at the output portion, and a precharge circuit is provided, so that the switch is arranged to be closed after the completion of the precharge to the capacitor by the precharge circuit so as to eliminate the excessive current at the time of the insertion of the power unit to prevent the DC supply line from being instantaneously cut.

Further, a power connecting method according to this invention is made such that a power supply is connected to a load and coupled to an input source and a precharge process is then provided which charges a capacitor, and the capacitor is connected to a line after the charging.

Still further, a power supply apparatus according to another embodiment is arranged such that, in order to eliminate the serial diode at the output portion, which diode causes the power loss, a switch is provided in series with a capacitor disposed at the output portion, a voltage from an output terminal is precharged through a resistor to the capacitor, and the switch is closed when a predetermined time period has elapsed.

Moreover, a power supply apparatus according to a further embodiment is arranged such that a switch is provided in series with a capacitor disposed at the output portion, a voltage from an output terminal is precharged through a resistor to the capacitor, and the voltage across the capacitor is detected by a comparator for closing control of the switch.

The operation will be described below.

If the serial diode is not provided at the output portion, since a rapid charging current is supplied through the DC supply line to the capacitor at the output portion when inserting the power unit, the DC supply line is instantaneously cut and hence an electronic circuit of a computer or the like which is the load operates in error. Thus, according to this invention, when inserting the power unit, the charging current is stopped by the switch and the capacitor is precharged from the AC line so as to previously give electric charge to the capacitor, thereafter closing the switch.

This pre-charging is made by a dedicated pre-charging circuit, or made via a resistor provided between the capacitor and the output terminal.

The resistor and the switch connected in series to the capacitor act as suppressing the rapid charging current to the capacitor which occurs when inserting the power unit.

Further, since this capacitor is indispensable for the operation of the power supply apparatus, the switch is closed after a predetermined time period has elapsed due to a delay or after the fact that the pre-charging voltage becomes a predetermined voltage is detected.

The above and other objects, features, and advantages of the invention will become more apparent from the following description when taken in conjunction with the accompanying drawings.

DESCRIPTION OF THE PREFERRED EMBODIMENT

Embodiment 1

Figure 1:
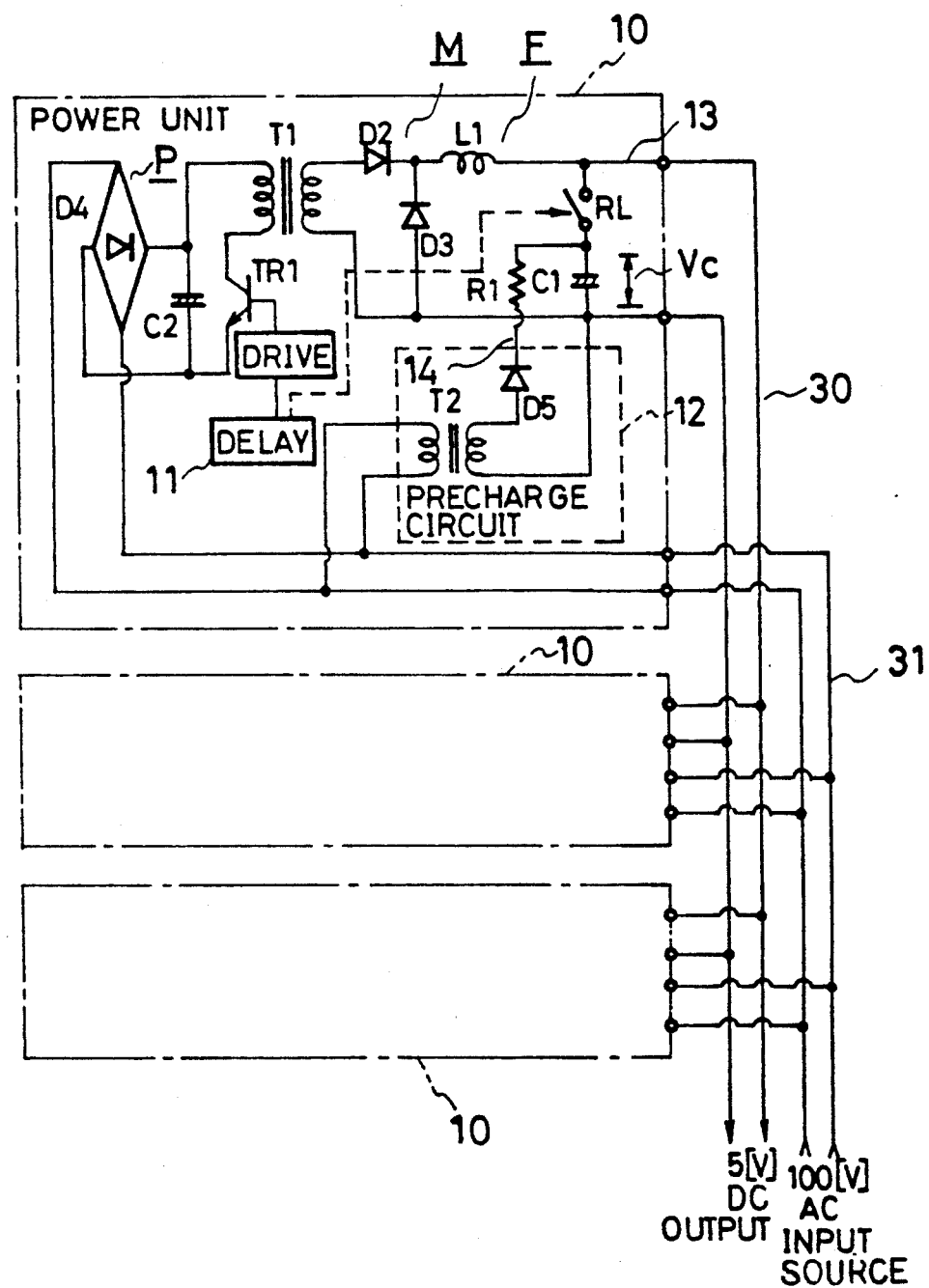
FIG. 1 is an illustration of an arrangement including a circuit of a basic portion a hot-line type power supply apparatus according to a first embodiment.

An embodiment of the present invention will be described hereinbelow with reference to the drawings. In FIG. 1, numeral 10 represents each of power units constituting a hot-line type power supply apparatus which is one of the power supply apparatus according to this invention. In the internal circuit of the power unit 10, D2 to D4 designate diodes, C2 denotes a capacitor, T1 depicts a pulse transformer for insulation, and Tr1 indicates a switching transistor for converting into a pulse voltage the direct-current voltage developed across the capacitor C2. These parts make up an input section for the current from an input source AC [100 V]. Further, C1 is a capacitor, D5 represents a diode, 11 designates a delay for producing delay by a predetermined time period, RL is a switch whose contact is controllable in accordance with a signal from the delay 11, R1 depicts a resistor for limiting current, and T2 is a transformer insulated from AC and converting a voltage. In addition, numeral 12 is a percharge circuit comprising the diode D5 and the transformer T2 and 13 is a direct current output line for outputting a direct current 5 [V] DC. Here, although three power units are illustrated in FIG. 1, the 5 [V] DC load can be covered by the total output capacity of two of the three power units.

Assuming that one of the power units 10 breaks down, the current supply from the faulty power unit to an output terminal 13 is stopped, while the remaining two power units continue to supply the 5 [V] DC to the load. That is, the output terminals 13 of a plurality of power units 10 are coupled to each other and output terminals 14 of the precharge circuits 12 for respectively precharging the AC inputs are coupled to each other, thereby constituting a power supply apparatus in which the entire output is not reduced even if one power unit is malfunctions. The operation of portions of the hot-line type power supply apparatus is similar to that of the conventional apparatus described above and hence omitted. Here, a description will be made hereinbelow in terms of operation when exchanging one power unit because of fault.

In removing the faulty power unit, the current between the 5 [V] DC lines (DC supply lines) is cut by means of the diode D2 so that current does not flow through the output terminal 13 line, thereby not affecting the 5 [V] DC lines. Further, in the case of inserting a new power unit therefor, although the voltage VC across the capacitor C1 is 0 V in the initial state, the switch RL is in the OFF state so that the charging current is not introduced from the 5 [V] DC line, thereby not affecting the 5 [V] DC line.

Figure 2:
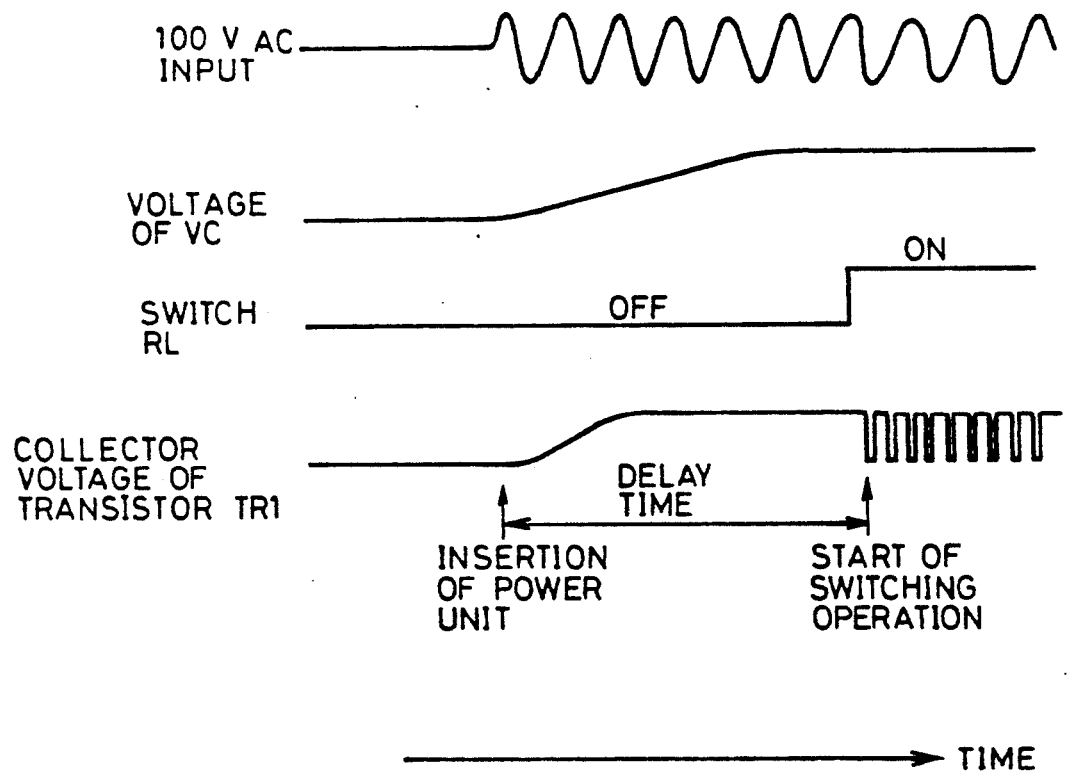
FIG. 2 is a timing chart for describing the operation of the FIG. 1 apparatus.

Operation of this portion will hereinbelow be described in detail with reference to FIG. 2. When a power unit is inserted into an electric circuit of a computer or the like (load connecting process) and a 100 [V] AC input is supplied to the power unit (input source connecting process), the AC voltage is applied through the transformer T2 of the precharge circuit 12 to the diode D5 and a direct-current voltage is developed at the output terminal 14 portion of the precharge circuit 12. Further, the direct-current voltage at this output terminal 14 portion causes the capacitor C1 to be charged with the current being limited by the resistor R1 (precharge process). On the other hand, a signal is generated from the delay 11 after a predetermined delay time so as to switch the switch RL from the OFF state to the ON state, and as a result the capacitor C1 is connected to the output terminal 13 line (switching process). If the charging of the capacitor C1 is designed to be completed when the switch RL turns ON, it is possible to prevent the charging current to the capacitor C1 from being introduced through the output terminal 13 line. Moreover, if the switching operation of the switching transistor TR1 is also arranged to be started through the delay 11, the capacitor C1 is always coupled to the output portion for the operation of the power source, thereby allowing stable operation.

As described above, in the hot-line type power supply apparatus according to the embodiment, the direct-current outputs of a plurality of direct-current power units are coupled in parallel to each other so that the direct-current output can be applied to the load without stopping even if one of the plurality of the power units is malfunctions and so that the faulty power unit is exchangeable with a normal power unit as the hot-line state is kept. That is, a switch is connected in series to a capacitor, which is inserted in parallel to the direct-current output portion, without inserting a backward current-limiting diode into the direct-current output line of the power unit in series, and the switch is controlled so as to take the OFF state when there is no AC input source to the power unit and take the ON state when a constant time period is elapsed after being coupled to the AC input source. In addition, the capacitor is charged before the constant time period by means of the precharge circuit which is arranged to generate a voltage from the AC input source side through the diode D5 and current-limiting resistor R1 coupled in series.

Embodiment 2

Although in the above-described embodiment 1 the precharge circuit 12 is simply composed of the transformer and the diode, it is also appropriate that the precharge circuit 12 further includes a regulator if required.

Embodiment 3

Furthermore, a description will be made hereinbelow in terms of a power supply apparatus according to a third embodiment of this invention. As described in the embodiment 1, the provision of the precharge circuit 12 provides a problem that the occupied volume of the apparatus increases. Accordingly, a power supply apparatus according to the third embodiment is for size-reduction of the apparatus.

Figure 3:
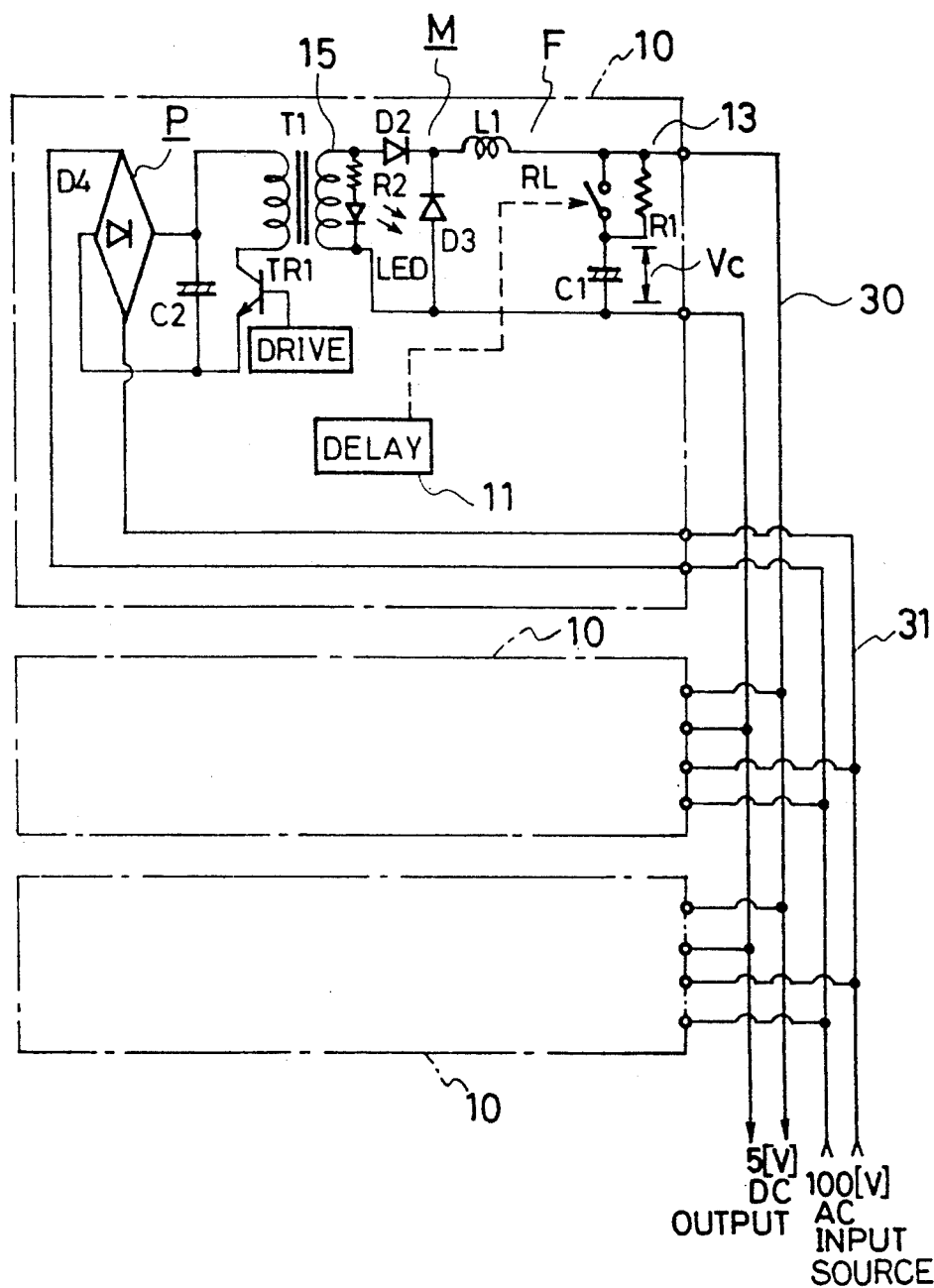
FIG. 3 is an illustration of an arrangement including a circuit of a basic portion of a hot-line type power supply apparatus according to a third embodiment.

In FIG. 3, parts similar or corresponding to those in FIG. 1 are indicated with the same marks and the description thereof will be omitted. Different portions are a resistor R1, a resistor R2 and a light-emitting diode LED, R1 being connected in series with a capacitor C1 and disposed in parallel to a switch RL, R2 being disposed at the secondary side 15 of a transformer T1, and LED being acting as an indication lamp for indicating the fact that the power unit does not break down.

In this embodiment, the faulty power unit is exchanged with a new power unit by the operator with the light-emitting diode LED turning OFF in response to lowering of the pulse voltage at the secondary side 15 of the transformer T1. When removing the faulty power unit, the current from the output terminal 13 does not flow into the inside of the faulty power unit due to a diode D2, thereby not affecting the 5 [V] DC line. Further, when inserting the new power unit therefor, although the voltage Vc across the capacitor C1 is 0 V in the initial state, since the switch is in the OFF state, the charging current from the 5 [V] DC line is limited by the resistor R1. Thus, if determining the value of the resistor R1 to an adequate value, it is possible to prevent the affection to the 5 [V] DC line.

Operation of this portion will again be described with reference to FIG. 2. When a power unit is inserted into a power supply apparatus housing for encasing it, the 5 [V] DC line is connected to the load circuit (load connecting process) and the 100 [V] AC input is connected to the power unit (input source connecting process), the charging current which is limited through the resistor R1 flows to the capacitor C1 so that the voltage across the capacitor C1 gradually increases (precharge process). On the other hand, a delay 11 generates a signal for switching the switch RL from OFF to ON after elapse of a delay time which is a constant time period from the input of the 100 [V] AC, whereby as a result the capacitor C1 is connected to the output terminal 13 line (switching process).

Here, if the capacitor C1 is arranged to be completed when the switch RL turns ON, it is possible to prevent the charging current from being rapidly supplied to the capacitor C1 to transitionally lower the voltage of the 5 [V] DC line, thereby avoiding the bad influence. Further, if the switching operation of the switching transistor TR1 is arranged to be started through the delay 11, the capacitor C1 results in being always coupled to the output portion for the operation of the power unit, thereby allowing stable operation.

Embodiment 4

Figure 4:
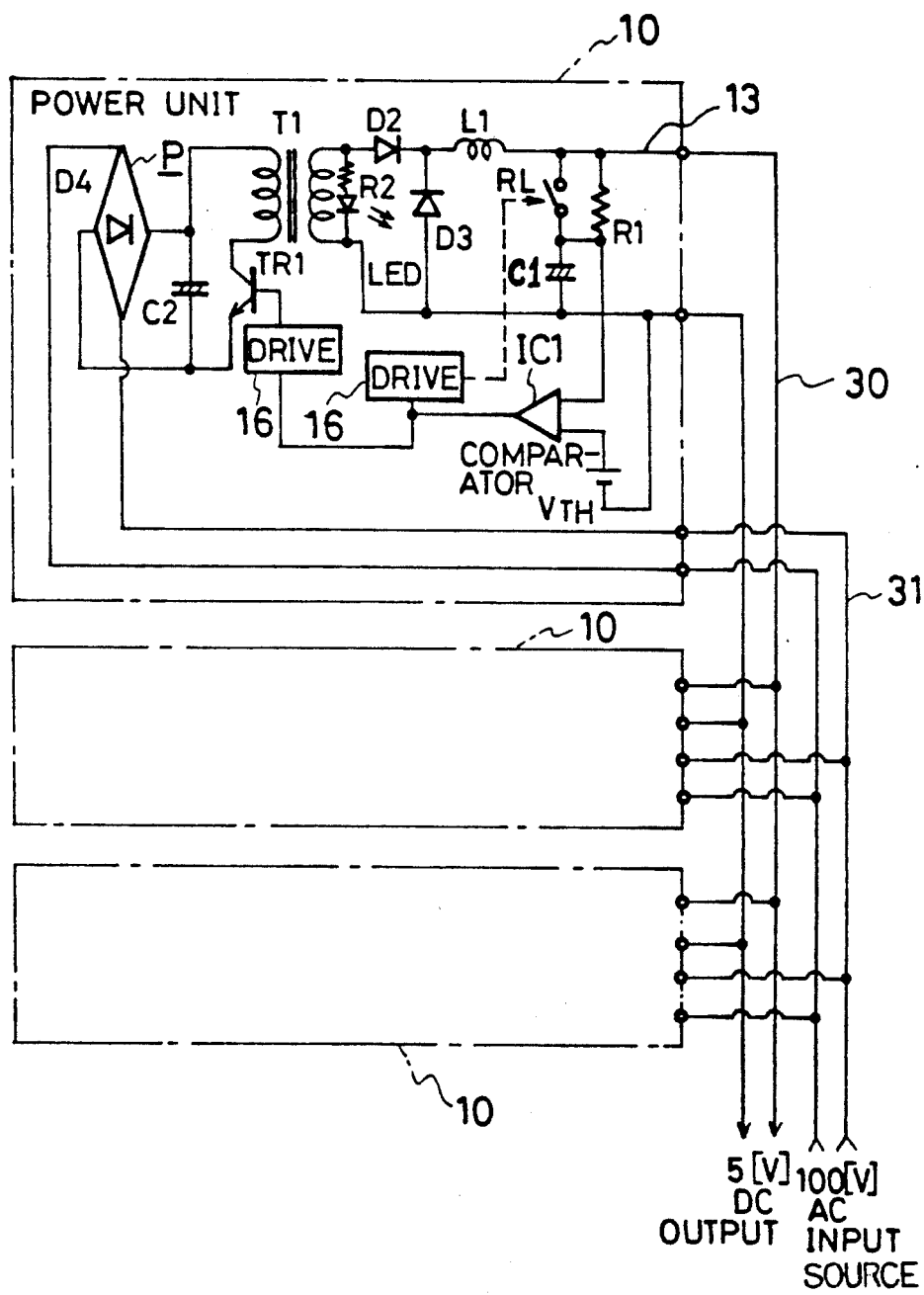
FIG. 4 is an illustration of an arrangement including a circuit of a basic portion of a hot-line type power supply apparatus according to a fourth embodiment.
Figure 5:
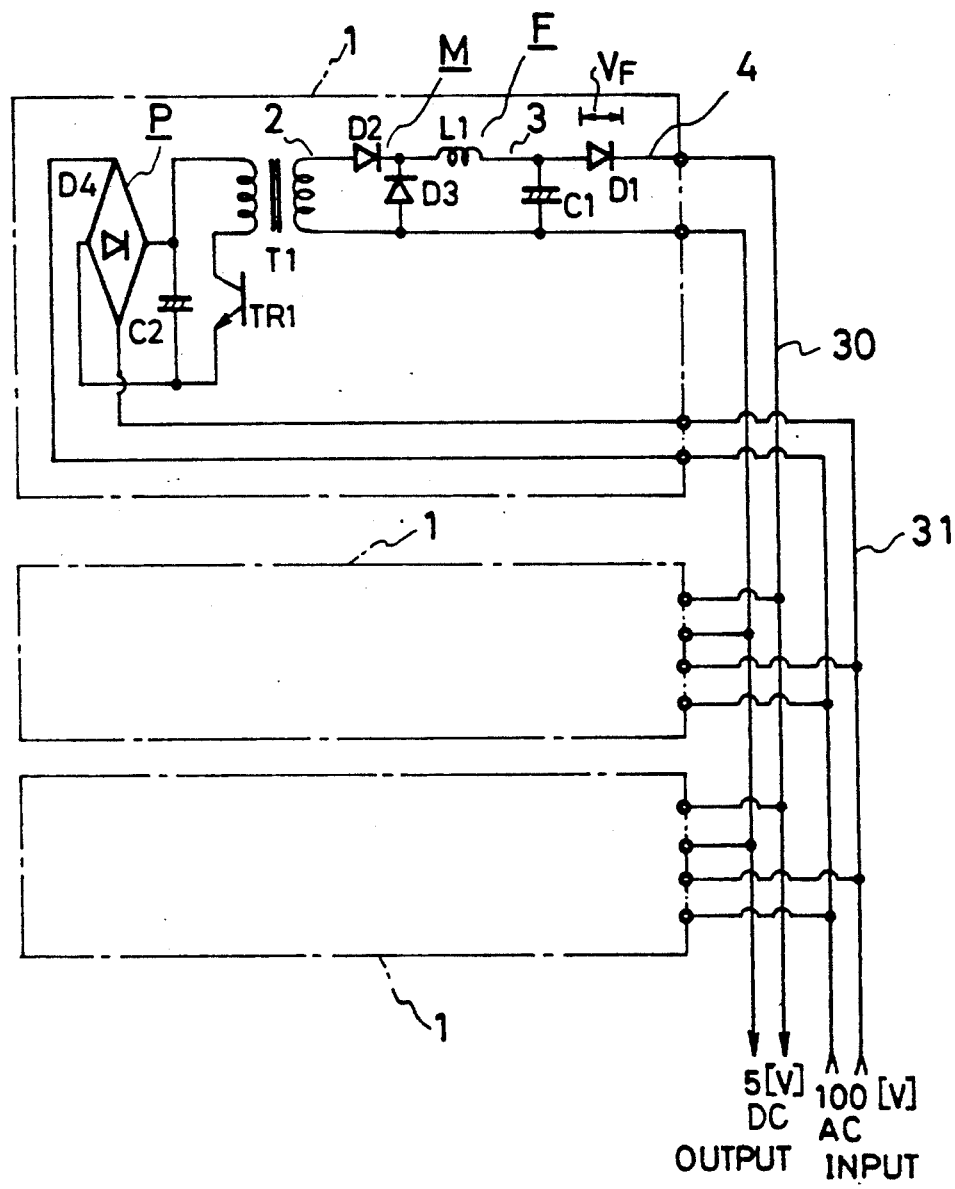
FIG. 5 is an illustration of an arrangement of a circuit of a basic portion of a conventional hot-line type power supply apparatus.

Moreover, a description will be made hereinbelow in terms of a fourth embodiment of this invention. Although in the above-described embodiment 3 the delay 11 is used for controlling the switch RL inserted in series to the capacitor C1, it is also appropriate that the voltage across the capacitor C1 is detected so that the switch RL is closed when the detected voltage becomes above a predetermined voltage. For example, in FIG. 4, IC1 is a comparator which generates an output signal when exceeding a reference voltage VTH, 16 represents a drive for operating a switching transistor TR1 with the switch RL turning ON. Since the operation of the FIG. 4 embodiment 4 is the same as the FIG. 3 embodiment 3 except for the control operation for switching the switch RL to ON, a description will here be made only in terms of the operation of the switch RL.

In the case of inserting a new power unit in place of the faulty power unit, the voltage Vc across the capacitor C1 is 0 V in the initial state and the current from the 5 [V] DC line is limited by the resistor R1 as the switch RL is in the OFF state, thereby not giving an influence to the 5 [V] DC line. Further, the charging current flows from the resistor R1 to the capacitor C1 so as to gradually increase the voltage across the capacitor C1 so that the comparator IC1 generates an output when exceeding the reference voltage VTH. With this output, the drive 16 drives the switch RL to turn it ON, and the switching drive is started so as to start the function of the power source. At this time, since the capacitor C1 is coupled to the 5 [V] DC output line 13, the operation of the power source can become stable.

As described above, according to the third embodiment, for realizing the insertion and removal of the power unit as the hot line is kept, the serial diode is not used at the output portion, the switch is provided in series with the capacitor inserted in parallel to the output terminal, and the resistor is disposed in parallel with the switch, whereby the switch turns ON when a predetermined time delay is elapsed after the AC input. Thus, it is possible to realize a high-efficiency power source which is capable of being size-reduced, which is capable of reducing the heat quantity. In addition, even if as described in the fourth embodiment the timing for the turning-ON of the switch is determined with the voltage across the capacitor inserted in parallel to the output terminal being detected to check the completion of the charging to the capacitor, it is possible to obtain the similar effect.

EMBODIMENT 5

Although in the above-described embodiments 3 and 4 the trouble of the power unit is detected by means of the resistor R1 and the light-emitting diode LED, it is also appropriate that the direct-current voltage due to a diode is detected by a comparator or the like so as to give an alarm through a means such as indicator and relay contact output.

Embodiment 6

Although in the above-described embodiments 1 to 4 the description is made with respect to the three power units, this invention is applicable to the case that the number of the power units is 2 or 4 or more.

Embodiment 7

Further, although in the above-described embodiments the circuit of the switching regulator portion is represented by the single inverter type circuit, it is possible to obtain the same effected even if using a different type power unit.

As described above, according to this invention, the switch is provided in series to the capacitor disposed at the output portion of the power unit and the timing for the turning-ON of the switch is delayed by a constant time period from the AC supply. Accordingly, it is possible to provided the effects that the efficiency of the power source can be improved and the heat can be suppressed.

What is claimed is:

1. A power supply apparatus comprising:
   an input section for receiving an input from an input source;
   a direct-current output line for providing a direct current output based on an output of said input section;
   a capacitor connected in parallel with said direct-current output line;
   a switch coupled in series with said capacitor, said switch in parallel with said direct-current output line; and
   means for closing said switch after a charging of said capacitor is completed.

2. A power supply apparatus as claimed in claim 1, wherein said capacitor is a capacitor for stability action.

3. A power supply apparatus as claimed in claim 1, further comprising alarm means for indicating whether power is supplied to said direct-current output line.

4. A power supply apparatus as claimed in claim 1, wherein an output line of said power supply apparatus is coupled in common to output lines of different power supply apparatus having the same structure as said power supply apparatus.

5. A power supply apparatus as claimed in claim 1, wherein the switch is a relay switch.

6. A power supply apparatus as claimed in claim 1, wherein the means for closing said switch is a delay circuit.

7. A power supply apparatus comprising:
   an input section for receiving an input from an input source;
   a direct-current output line for providing a direct current output;
   a capacitor connected in parallel with said direct-current output line;
   a switch coupled in series with said capacitor;
   a resistor connected in parallel with said switch, said resistor and said switch in parallel with said output line; and
   a delay circuit for closing said switch when a constant delay time is elapsed after said input section is connected to said input source.

8. A power supply apparatus as claimed in claim 7, wherein the switch is a relay switch.

9. A power supply apparatus as claimed in claim 7, wherein the output line is coupled to a plurality of power supply apparatuses, each having the same structure as said power supply apparatus.

10. A power supply apparatus comprising:
    an input section for receiving a current from an input source;
    a direct-current output line for providing a direct current output;
    a capacitor connected in parallel with said direct-current output line;
    a switch coupled in series with said capacitor;
    a precharge circuit for charging said capacitor after said input section is connected to said input source; and
    means for closing said switch after said capacitor is charged by said precharge circuit.

11. A power supply apparatus as claimed in claim 10, wherein the precharge circuit is coupled to the input source, and is independent of the input section.

12. A power supply apparatus as claimed in claim 10, wherein the means for closing said switch is a delay circuit.

13. A power supply apparatus as claimed in claim 10, wherein the switch is a relay switch.

14. A power supply apparatus as claimed in claim 10, wherein the output line is coupled to a plurality of power supply apparatuses, each having the same structure as said power supply apparatus.

15. A power connecting method comprising the steps of:
    coupling a power unit to a load circuit;
    coupling an input source to said power unit;
    charging a capacitor in said power unit; and
    coupling said capacitor to a direct-current output line which is in parallel with the capacitor by closing a switch in series with said capacitor after said capacitor is charged, said switch in parallel with the direct-current output line.

16. A power supply apparatus comprising:
    an input section for providing a current from an input source;
    a direct-current output line for providing a direct current output;
    a capacitor coupled in parallel with said direct-current output line;
    a switch coupled in series with said capacitor, said switch in parallel with said output line;
    a resistor coupled in parallel with said switch;
    a comparator for detecting voltage across said capacitor and for generating an output signal when the detected voltage exceeds a predetermined reference voltage; and
    a drive circuit for closing said switch in response to the generation of said output signal of said comparator.

17. A power supply apparatus as claimed in claim 16, wherein the switch is a relay switch.

18. A power supply apparatus as claimed in claim 16, wherein the output line is coupled to a plurality of power supply apparatuses, each having the same structure as said power supply apparatus.

* * * * *